United States Patent
Jung (10) Patent No.: US 12,194,521 B2
(45) Date of Patent: Jan. 14, 2025

(54) EQUIPMENT FOR MANUFACTURING SEPARATOR FOR FUEL CELL AND METHOD OF MANUFACTURING SAME

(71) Applicant: ELF SYSTEM CO., LTD., Changwon-si (KR)

(72) Inventor: Byung-Soo Jung, Changwon-si (KR)

(73) Assignee: Elf System Co., LTD, Changwon-si (KR)

( * ) Notice: Subject to any disclaimer, the term of this patent is extended or adjusted under 35 U.S.C. 154(b) by 591 days.

(21) Appl. No.: 17/609,825

(22) PCT Filed: Jul. 23, 2020

(86) PCT No.: PCT/KR2020/009733
§ 371 (c)(1),
(2) Date: Nov. 9, 2021

(87) PCT Pub. No.: WO2021/015575
PCT Pub. Date: Jan. 28, 2021

(65) Prior Publication Data
US 2022/0226875 A1 Jul. 21, 2022

(30) Foreign Application Priority Data
Jul. 24, 2019 (KR) .......................... 10-2019-0089563

(51) Int. Cl.
*B21C 47/00* (2006.01)
*B21D 39/02* (2006.01)
(Continued)

(52) U.S. Cl.
CPC .......... *B21C 47/006* (2013.01); *B21D 39/026* (2013.01); *H01M 8/0206* (2013.01); *H01M 8/0228* (2013.01); *H01M 8/0258* (2013.01)

(58) Field of Classification Search
None
See application file for complete search history.

(56) References Cited

U.S. PATENT DOCUMENTS 3,294,379 A 12/1966 Desperier
5,720,466 A * 2/1998 Skipper ................ A47B 23/044
248/460

(Continued)

FOREIGN PATENT DOCUMENTS

JP 2012182140 A * 9/2012
KR 100988915 B1 10/2010
(Continued)

OTHER PUBLICATIONS

Prior Art Search of Request for Accelerated Examination for corresponding Application No. KR 10-2019-0089563, dated Mar. 4, 2024, 4 pages.
(Continued)

*Primary Examiner* — Devang R Patel
(74) *Attorney, Agent, or Firm* — Dority & Manning, P.A.

(57) ABSTRACT

Equipment for manufacturing a separator plate for a fuel cell, according to an embodiment of the present disclosure, includes: a first uncoiler uncoiling a first metal strip; a second uncoiler uncoiling a second metal strip; a press receiving the first metal strip and the second metal strip to respectively form patterns thereon; a welding machine overlapping and integrally bonding the first metal strip and the second metal strip, transferred from the press, by a welding process; and a cutter cutting a bonded body of the first metal strip and the second metal strip, transferred from the welding machine, wherein the press, the welding machine, and the cutter are sequentially arranged, and the first metal strip and the second metal strip are passed through the press, the welding machine, and the cutter, while connected to each other, to be processed.

9 Claims, 6 Drawing Sheets

(51) Int. Cl.
*H01M 8/0206* (2016.01)
*H01M 8/0228* (2016.01)
*H01M 8/0258* (2016.01)

(56) References Cited

U.S. PATENT DOCUMENTS

| | | | | |
|---|---|---|---|---|
| 8,241,373 | B2 * | 8/2012 | Yang | H01M 8/0267 |
| | | | | 429/535 |
| 8,252,483 | B2 | 8/2012 | Iino et al. | |
| 8,293,427 | B2 * | 10/2012 | Takada | H01M 8/242 |
| | | | | 429/522 |
| 9,662,700 | B2 * | 5/2017 | Taguchi | H01M 8/0206 |
| 9,789,634 | B2 * | 10/2017 | Utashiro | B29C 43/021 |
| 9,884,357 | B2 * | 2/2018 | Taguchi | H01M 8/0206 |
| 2005/0238941 | A1 * | 10/2005 | Nishi | H01M 8/0213 |
| | | | | 252/511 |
| 2011/0111329 | A1 | 5/2011 | Tazoe | |
| 2012/0061453 | A1 * | 3/2012 | Vogt | B23K 26/26 |
| | | | | 228/160 |
| 2014/0123720 | A1 | 5/2014 | Alber et al. | |
| 2015/0121678 | A1 | 5/2015 | Noe et al. | |
| 2016/0074919 | A1 | 3/2016 | Taguchi | |

FOREIGN PATENT DOCUMENTS

| | | |
|---|---|---|
| KR | 10-0999073 | 12/2010 |
| KR | 101125076 B1 | 3/2012 |
| KR | 101230807 B1 | 2/2013 |
| KR | 101321125 | 10/2013 |
| KR | 101321125 B1 * | 10/2013 |
| KR | 10-2048461 | 11/2019 |
| WO | WO2010/063560 | 6/2010 |
| WO | WO 2014/188800 | 11/2014 |

OTHER PUBLICATIONS

PCT International Search Report (w/ English translation) for corresponding PCT Application No. PCT/KR2020/009733, Oct. 15, 2020, 8 pages.
European Search Report for corresponding European Application No. EP 20843093.4, issued May 19, 2022, 5 pages.

* cited by examiner

EQUIPMENT FOR MANUFACTURING SEPARATOR FOR FUEL CELL AND METHOD OF MANUFACTURING SAME

CROSS REFERENCE TO RELATED APPLICATIONS

This application is the U.S. National Stage entry of International Application No. PCT/KR2020/009733 filed under the Patent Cooperation Treaty and having a filing date of Jul. 23, 2020, which claims priority to Korean Patent Application No. 10-2019-0089563 having a filing date of Jul. 24, 2019, which are incorporated herein by reference.

TECHNICAL FIELD

The present disclosure relates to equipment for manufacturing a separator plate for a fuel cell and a method of manufacturing the same.

BACKGROUND ART

Fuel cells generate electrical energy through an electrochemical reaction between hydrogen and oxygen, and have a structure in which separator plates are disposed on both sides of a membrane electrode assembly (MEA). These fuel cells may be connected to a plurality of unit cells in series to form a fuel cell stack.

The separator plates for the fuel cells may be composed of an anode separator plate for supplying fuel gas (hydrogen gas) to the membrane electrode assembly, and a cathode separator plate for supplying oxidizing gas (air) to the membrane electrode assembly, with the membrane electrode assembly interposed therebetween, and the anode separator plate and the cathode separator plate have an structure integrated by a welding bonding process (a welding type) or a gasket bonding process (a gasket type).

Conventionally, in manufacturing a separator plate, a material constituting an anode separator plate and a material constituting a cathode separator plate may be cut to have a plate shape, respectively, may be separately supplied, and a stamping process and a forming inspection process may be performed individually for each of the materials, to manufacture the anode separator plate and the cathode separator plate as products. In this manner, the anode separator plate and cathode separator plate, respectively manufactured as individual products, may be transferred in a loaded state, respectively, and the anode separator plate and the cathode separator plate may be respectively supplied as a single from a stack of anode separator plates and a stack of cathode separator plates, and may be manufactured as an integrated separator plates by a welding bonding process or a gasket bonding process.

As described above, the conventional processes may be performed individually and intermittently, it may take time to perform a subsequent process, manpower should be input for each of the processes for performing the processes, and an overall manufacturing process may become complicated.

DISCLOSURE

Technical Problem

The present disclosure has been devised to solve the above problems, and the problem to be solved in the present disclosure is to provide equipment for manufacturing a separator plate for a fuel cell and a method of manufacturing the same, in which processes are continuously carried out in an in-line manner, without individually and intermittently in manufacturing the separator plate.

However, the object of the present disclosure is not limited thereto, and even if not explicitly mentioned, the object or effect that may be grasped from the solutions or embodiments of the problems, described below, will be included therein.

Technical Solution

Equipment for manufacturing a separator plate for a fuel cell, according to an embodiment of the present disclosure, includes a first uncoiler uncoiling a first metal strip; a second uncoiler uncoiling a second metal strip; a press receiving the first metal strip and the second metal strip to respectively form patterns thereon; a welding machine overlapping and integrally bonding the first metal strip and the second metal strip, transferred from the press, by a welding process; and a cutter cutting a bonded body of the first metal strip and the second metal strip, transferred from the welding machine, wherein the press, the welding machine, and the cutter are sequentially arranged, and the first metal strip and the second metal strip are passed through the press, the welding machine, and the cutter, while connected to each other, to be processed.

The press may further form a first alignment hole and a second alignment hole in the first metal strip and the second metal strip, respectively, wherein the first metal strip and the second metal strip, transferred from the press, may overlap in a state in which the first alignment hole and the second alignment hole correspond to each other, to align the patterns to face each other.

The press may include a first mold, a second mold disposed below the first mold, a first punch disposed between the first mold and the second mold to face the first mold, and a second punch disposed between the first mold and the second mold to face the second mold, wherein the first punch and the second punch may be configured to be integrally connected and reciprocate integrally between the first mold and the second mold.

The press may include a first press including a first mold and a first punch, and a second press disposed below the first press and including a second mold and a second punch, wherein the first press and the second press are driven individually.

The equipment may further include a coil joiner disposed between the first and second uncoilers and the press, wherein the coil joiner may connect a rear end portion of one first metal strip uncoiled from the first uncoiler and a front end portion of the other first metal strip mounted on the first uncoiler to have a coil shape, and may connect a rear end portion of one second metal strip uncoiled from the second uncoiler and a front end portion of the other second metal strip mounted on the second uncoiler to have a coil shape.

The equipment may further include an inspection machine disposed between the press and the welding machine, wherein the inspection machine may perform inspection on the patterns of the first metal strip and the second metal strip, transferred from the press to the welding machine.

The equipment may further include a plurality of guide rolls disposed in at least one of a front position or a rear position of the press, to pass the first metal strip through the press in a position spaced apart from the second metal strip in a vertical direction and supply the first metal strip to the welding machine, to guide the first metal strip.

A method of manufacturing a separator plate for a fuel cell, according to an embodiment of the present disclosure, includes a forming operation of arranging a first metal strip uncoiled and transferred from a first uncoiler and a second metal strip uncoiled and transferred from a second uncoiler side by side in a vertical direction, and forming an anode separator plate pattern on the first metal strip and forming a cathode separator plate pattern on the second metal strip by processing; a bonding operation of overlapping the first metal strip and the second metal strip, transferred after the forming operation, and welding the anode separator plate pattern and the cathode separator plate pattern, aligned to face each other, to be integrally bonded; and a cutting operation of cutting a bonded body of the first metal strip and the second metal strip, transferred after the bonding operation, to separate the first metal strip and the second metal strip, wherein the first metal strip and the second metal strip may be processed by sequentially performing the forming operation, the bonding operation, and the cutting operation in an in-line manner.

The forming operation may further include forming a first alignment hole in the first metal strip and forming a second alignment hole in the second metal strip, wherein in the bonding operation, the first metal strip and the second metal strip may overlap in a state in which the first alignment hole and the second alignment hole correspond to each other, to align the anode separator plate pattern and the cathode separator plate pattern.

The method may further include a connection operation of connecting a rear end portion of one first metal strip uncoiled from the first uncoiler and a front end portion of the other first metal strip mounted on the first uncoiler to have a coil shape, and connecting a rear end portion of one second metal strip uncoiled from the second uncoiler and a front end portion of the other second metal strip mounted on the second uncoiler to have a coil shape.

The method may further include an inspection operation of inspecting the anode separator plate pattern and the cathode separator plate pattern in the first metal strip and the second metal strip, transferred after the forming operation.

The method may further include an attachment operation of attaching a metal sheet having a mesh shape to a surface of at least one of the first metal strip or the second metal strip, after the bonding operation.

Advantageous Effects

According to an aspect of the present disclosure, equipment for manufacturing a separator plate for a fuel cell and a method of manufacturing the same, in which processes are continuously carried out in an in-line manner, without individually and intermittently in manufacturing the separator plate, may be provided.

Various advantages and effects of the present disclosure are not limited to the above, and will be more easily understood in the process of describing specific embodiments of the present disclosure.

| *DESCRIPTION OF REFERENCE NUMERALS * | | | |
|---|---|---|---|
| 1, 2 | EQUIPMENT OF MANUFACTURING A SEPARATOR PLATE FOR A FUEL CELL | | |
| 10 | FISRT UNCOILER | | |
| 20 | SECOND UNCOILER | 30, 30', 30" | PRESS |
| 31 | FIRST MOLD | 32 | SECONC MOLD |
| 33 | FISRT PUNCH | 34 | SECOND PUNCH |
| 35 | GUIDE ROD | 36 | UPPER FRAME |
| 37 | BOTTOM FRAME | 38 | MIDDLE FRAME |
| 40 | WELDING MACHINE | 50 | CUTTER |
| 60 | INSPECTION MACHINE | 70 | COIL JOINER |
| 80 | GUIDE ROLL | 90 | PINCH ROLL |
| M1 | FIRST METAL STRIP | M2 | SECOND METAL STRIP |
| AP | ANODE SEPARATOR PLATE PATTERN | | |
| CP | CATHODE SEPARATOR PLATE PATTERN | | |
| H1 | FIRST ALIGNMENT HOLE | H2 | SECOND ALIGNMENT HOLE |
| SP | SEPARATOR PLATE | | |

BEST MODE FOR INVENTION

Hereinafter, example embodiments will be described in detail with reference to the accompanying drawings such that those of ordinary skill in the art may easily implement the present disclosure. However, in describing a preferred embodiment of the present disclosure in detail, if it is determined that a detailed description of a related known function or configuration may unnecessarily obscure the subject matter of the present disclosure, the detailed description thereof will be omitted. In addition, the same reference numerals may be used throughout the drawings with respect to components having similar functions and operations. In addition, in this specification, terms such as 'on or above,' 'upper,' 'upper surface,' 'below,' 'lower,' 'lower surface,' and the like are based on the drawings, and in fact, elements or components may vary depending on a direction in which they are placed.

In addition, throughout the specification, when a portion may be described to be 'connected' with another portion, this may refer to not only 'directly connected', but also 'indirectly connected' with another element interposed therebetween. In addition, "including" a certain component may refer that other components are not excluded, other components may be further included, unless otherwise stated.

Figure 1:
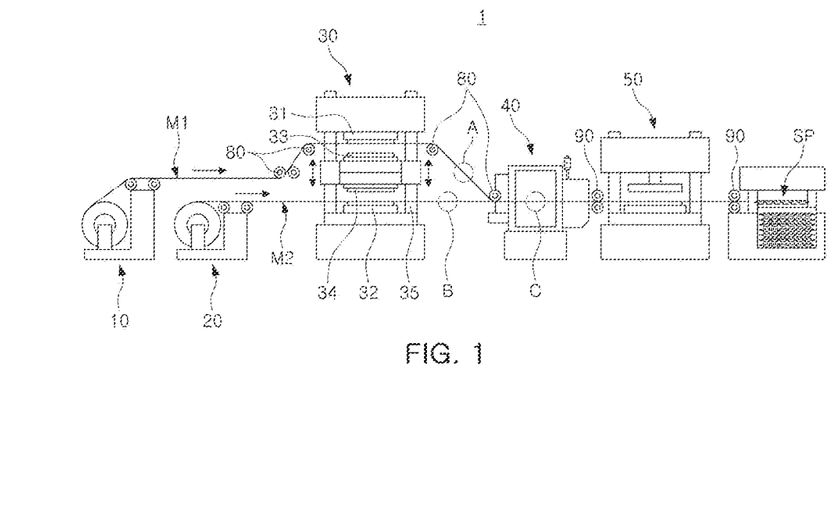
FIG. 1 is a schematic view illustrating equipment for manufacturing a separator plate for a fuel cell, according to an embodiment of the present disclosure.
Figure 2:
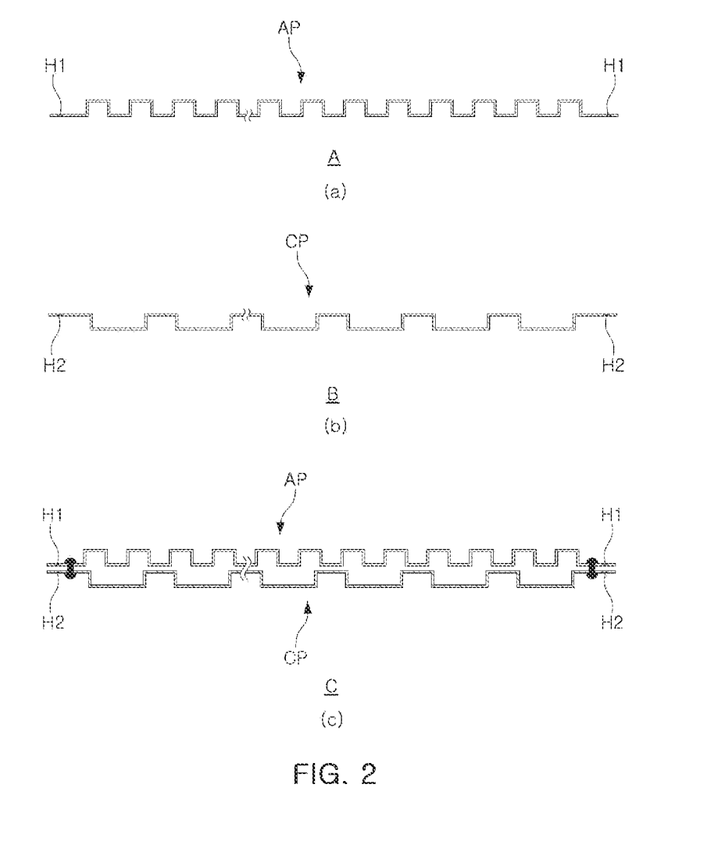
FIGS. 2(a) to 2(c) are schematic views illustrating portions 'A,' 'B,' and 'C' in FIG. 1, respectively.
Figure 3:
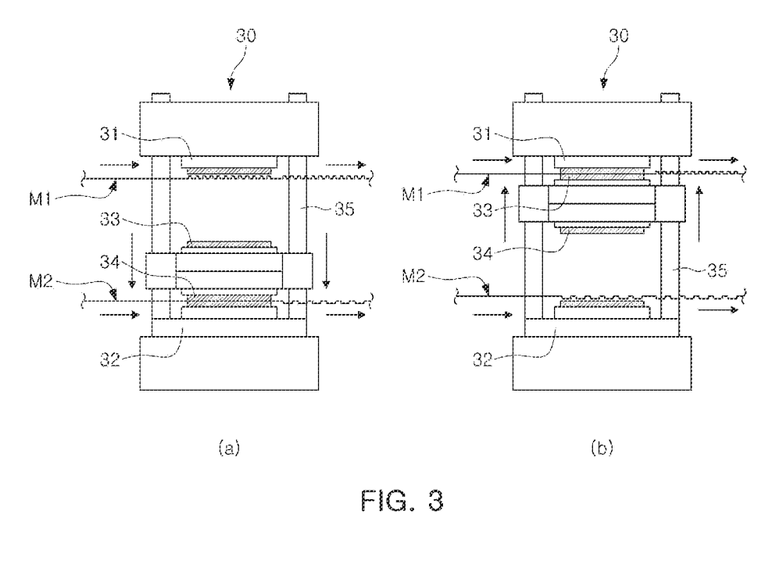
FIGS. 3(a) and 3(b) are schematic views illustrating an example of an operation of a press in the equipment of FIG. 1.
Figure 4:
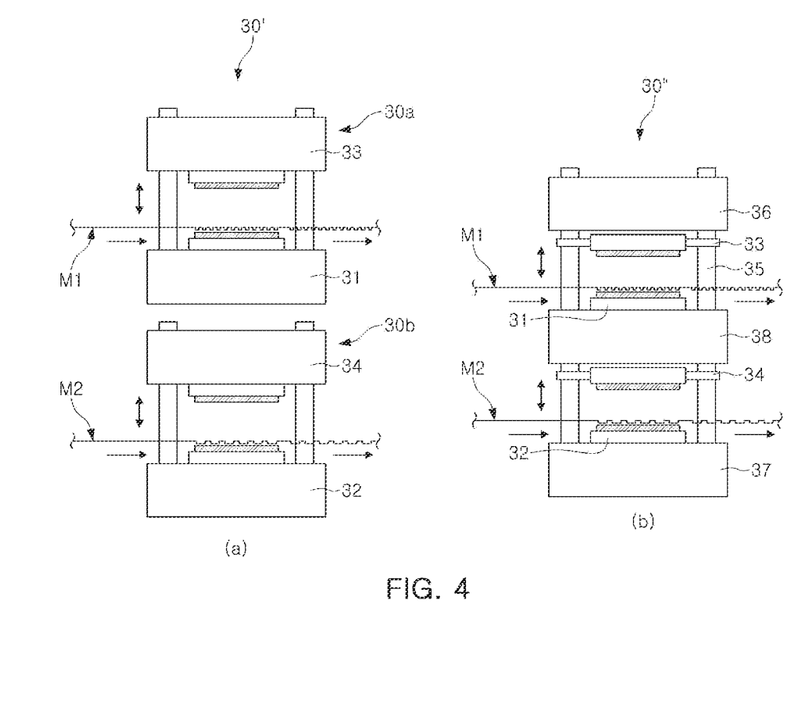
FIGS. 4(a) and 4(b) are schematic views illustrating another example of an operation of a press in the equipment of FIG. 1.

Equipment for manufacturing a separator plate for a fuel cell, according to an embodiment of the present disclosure, will be described with reference to FIGS. 1 to 4. FIG. 1 is a schematic view illustrating equipment for manufacturing a separator plate for a fuel cell, according to an embodiment of the present disclosure, FIGS. 2(a) to 2(c) are schematic views illustrating portions 'A,' 'B,' and 'C' in FIG. 1, respectively, FIGS. 3(A) and 3(B) are schematic views illustrating an example of an operation of a press in the equipment of FIG. 1, and FIGS. 4(a) and 4(b) are schematic views illustrating another example of an operation of a press in the equipment of FIG. 1, respectively.

Referring to the drawings, equipment 1 for manufacturing a separator plate for a fuel cell, according to an embodiment of the present disclosure, may include a first uncoiler 10, a second uncoiler 20, a press 30, a welding machine 40, and a cutter 50.

In an embodiment, the press 30, the welding machine 40, and the cutter 50 may be sequentially arranged, and a first metal strip M1 and a second metal strip M2, respectively transferred from the first uncoiler 10 and the second uncoiler 20, may be sequentially passed through the press 30, the welding machine 40, and the cutter 50, while connected to each other, to be processed.

The first uncoiler 10 may uncoil and transfer the first metal strip M1 coiled and mounted to have a coil shape. In addition, the second uncoiler 20 may uncoil and transfer the second metal strip M2 coiled and mounted to have a coil shape.

The press 30 may respectively form patterns on the first metal strip M1 and the second metal strip M2 by processing. In an embodiment, an anode plate pattern AP and a first alignment hole H1 may be formed in the first metal strip M1, and a cathode plate pattern CP and a second alignment hole H2 may be formed in the second metal strip M2.

The first metal strip M1 on which the anode plate pattern AP is formed may constitute an anode plate of a separator plate SP, and the second metal strip M2 on which the cathode plate pattern CP is formed may constitute a cathode plate of a separator plate SP.

The press 30 may arrange the first metal strip M1 supplied from the first uncoiler 10 and the second metal strip M2 supplied from the second uncoiler 20, side by side, to be spaced apart from each other by a predetermined interval. In an embodiment, the first metal strip M1 and the second metal strip M2 may be arranged to be side to side with each other in an upper portion and a lower portion of the press 30, respectively. According to an embodiment, alternatively, the first metal strip M1 and the second metal strip M2 may be arranged to be side to side with each other in the lower portion and the upper portion of the press 30, respectively.

In an embodiment, the anode plate pattern AP may include an anode channel and a manifold, and the cathode plate pattern CP may include a cathode channel and a manifold. In addition, the first alignment hole H1 and the second alignment hole H2 may be formed adjacent to an edge of the first metal strip M1 and an edge of the second metal strip M2, respectively, in a longitudinal direction.

Referring to the drawings, the press 30 may include a first mold 31, a second mold 32 disposed below the first mold 31, a first punch 33 disposed between the first mold 31 and the second mold 32 to face the first mold 31, and a second punch 34 disposed between the first mold 31 and the second mold 32 to face the second mold 32. The first punch 33 and the second punch 34 may be configured to integrally connect each other, to vertically reciprocate between the first mold 31 and the second molds 32, along a guide rod 35 connecting the first mold 31 and the second mold 32

In an embodiment, the first metal strip M1 may be supplied between the first mold 31 and the first punch 33, and the second metal strip M2 may be supplied between the second mold 32 and the second punch 34. Then, as the first punch 33 and the second punch 34 reciprocate between the first mold 31 and the second mold 32 in a vertical direction, the first punch 33 may alternately press the first metal strip M1 between the first punch 33 and the first mold 31 to form the anode plate pattern AP and the first alignment hole H1, and the second punch 34 may alternately press the second metal strip M2 to form the cathode plate pattern CP and the second alignment hole H2.

In this embodiment, although it is illustrated that the anode plate pattern AP is formed on the first metal strip M1 and the cathode plate pattern CP is formed on the second metal strip M2, the cathode plate pattern CP may be formed on the first metal strip M1 and the anode plate pattern AP may be formed on the second metal strip M2.

FIGS. 4(a) and 4(b) are schematic views illustrating another example of an operation of a press in the equipment of FIG. 1, respectively.

Referring to FIG. 4 (a), a press 30' may include a first press 30a and a second press 30b disposed below the first press 30a. The first press 30a may include a first mold 31 and a first punch 33, and the second press 30b may include a second mold 32 and a second punch 34.

The first press 30a and the second press 30b may be individually driven to form an anode plate pattern AP and a first alignment hole H1 in a first metal strip M1, and a cathode plate pattern CP and a second alignment hole H2 in a second metal strip M2.

Referring to FIG. 4 (b), a press 30" may include an upper frame 36, a lower frame 37 disposed below the upper frame 36, and an intermediate frame 38 disposed between the upper frame 36 and the lower frame 37. The intermediate frame 38 may be supported and fixed on the lower frame 37, and the upper frame 36 may be supported and fixed on the intermediate frame 38, by a plurality of guide rod 35.

A first mold 31 may be provided on an upper surface of the fixed intermediate frame 38, and a second mold 32 may be provided on an upper surface of the lower frame 37. A first punch 33 may be provided between the upper frame 36 and the first mold 31 to face the first mold 31, and a second punch 34 may be provided between the intermediate frame 38 and the second mold 32 to face the second mold 32. The first punch 33 and the second punch 34 may be configured to be individually driven to vertically reciprocate along the guide rod 35, respectively.

Referring to the drawings, a plurality of guide rolls 80 may be disposed on at least one of a front position or a rear position of the press 30. The guide roll 80 may pass the first metal strip M1 through the press 30 in a position spaced apart from the second metal strip M2 in a vertical direction and may supply the first metal strip M1 to the welding machine 40, to guide the first metal strip M1.

The welding machine 40 may be disposed adjacent to the press 30, and may integrally bond the first metal strip M1 and the second metal strip M2, passed through the press 30. For example, the welding machine 40 may include a laser welding machine, and may weld the first metal strip M1 and the second metal strip M2 by a high-speed scan welding process.

The welding machine 40 may overlap, weld, and bond integrally the first metal strip M1 and the second metal strip M2, in a state in which the anode plate pattern AP and the cathode plate pattern CP are aligned to face each other. In an embodiment, the anode plate pattern AP and the cathode plate pattern CP may be vertically aligned, and may be also aligned in a reverse order.

In welding and bonding the first metal strip M1 and the second metal strip M2, it may be important that the anode plate pattern AP and the cathode plate pattern CP are accurately aligned in positions corresponding to each other. Since this alignment is directly related to quality of the separator plate SP, it needs to be done in an automatic manner using an apparatus.

The first metal strip M1 and the second metal strip M2, separated and transferred separately in this embodiment, may overlap the first alignment hole H1 and the second alignment hole H2, respectively, in a state in which they correspond to each other, to align the anode plate pattern AP and the cathode plate pattern CP. In this case, it may be configured that, whether the first alignment hole H1 and the second alignment hole H2 correspond to each other is checked, for example, by reading an image captured using a camera (not illustrated) to automatically check whether the first alignment hole H1 and the second alignment hole H2 correspond to each other.

According to an embodiment, a metal sheet (not illustrated) having a mesh shape may be further attached to a surface of at least one of the first metal strip M1 or the second metal strip M2. The metal sheet having a mesh shape may be attached by welding, and may constitute a flow path, together with the anode plate pattern AP or the cathode plate pattern CP.

The cutter 50 may be disposed adjacent to the welding machine 40, and may cut a bonded body of the first metal strip M1 and the second metal strip M2, transferred through the welding machine 40. For example, the cutter 50 may include a cutting press.

The cutter 50 may cut the bonded body of the first metal strip M1 and the second metal strip M2, bonded by welding, to separate the first metal strip M1 and the second metal strip M2. Through this, a separator plate SP for a fuel cell in which an anode plate and a cathode plate are bonded may be manufactured by welding.

The separator plate SP for a fuel cell, manufactured in this manner, may be packaged and shipped by a loading apparatus, after performing a finishing process such as scrap processing or the like and then performing an external inspection process, an air tightness inspection process, or the like, to be confirmed as a final product.

In an embodiment, pinch rolls 90 may be disposed on a front position and a rear position of the cutter 50, and may guide to pass the first metal strip M1 and the second metal strip M2 respectively uncoiled through the press 30, the welding machine 40, and the cutter 50, and to be transferred.

As described above, according to the equipment 1 for manufacturing a separator plate for a fuel cell, the first metal strip M1 and the second metal strip M2, uncoiled and transferred from the first uncoiler 10 and the second uncoiler 20, respectively, may be processed while sequentially passing through the press 30, the welding machine 40, and the cutter 50 in an in-line manner, to continuously manufacture the fuel cell separator plate SP at high speed. For example, a metal strip coiled in a coil shape may be sequentially processed in a process of being transferred integrally by apparatuses arranged in a line as the first metal strip M1 and the second metal strip M2 are uncoiled, and may be then separated from the metal strip to complete the separator plate SP for a fuel cell, and a cycle time period for manufacturing the separator plate SP for a fuel cell may be reduced. Therefore, effects of significantly shortening a process time period as well as improving production capacity may be provided, as compared to a case in which a separator plate is manufactured by intermittently performing conventional processes.

Figure 5:
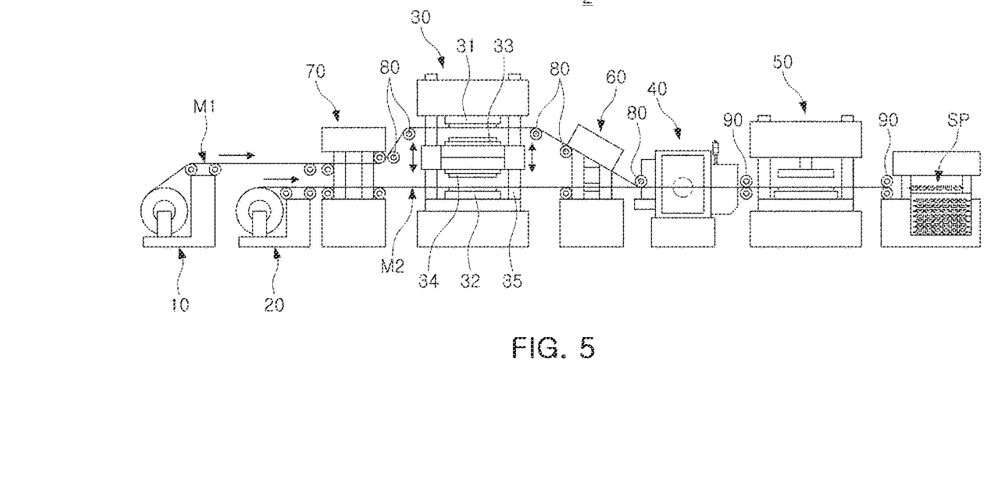
FIG. 5 is a schematic view illustrating equipment for manufacturing a separator plate for a fuel cell, according to another embodiment of the present disclosure.

FIG. 5 is a schematic view illustrating equipment for manufacturing a separator plate for a fuel cell, according to another embodiment of the present disclosure.

Referring to the drawings, equipment 2 for manufacturing a separator plate for a fuel cell, according to an embodiment of the present disclosure, may further include an inspection machine 60.

The inspection machine 60 may be disposed between a press 30 and a welding machine 40. The inspection machine 60 may perform inspection on an anode plate pattern AP and a first alignment hole H1 and inspection on a cathode plate pattern CP and a second alignment hole H2 in a first metal strip M1 and a second metal strip M2, respectively, transferred from the press 30 to the welding machine 40.

For example, the inspection machine 60 checks whether the anode plate pattern AP and the cathode plate pattern CP is abnormal, whether the first alignment hole H1 and the second alignment hole H2 are abnormal, whether breakage (crack) occurs, or the like by a three-dimensional vision inspection.

Referring to the drawings, equipment 2 for manufacturing a separator plate for a fuel cell, according to an embodiment of the present disclosure, may further include a coil joiner 70.

The coil joiner 70 may be disposed between first and second uncoilers 10 and 20 and the press 30.

The coil joiner 70 may connect a rear end portion of one first metal strip M1 uncoiled from the first uncoiler 10 and a front end portion of the other first metal strip M1 mounted on the first uncoiler 10 to have a coil shape, and may connect a rear end portion of one second metal strip M2 uncoiled from the second uncoiler 20 and a front end portion of the other second metal strip M2 mounted on the second uncoiler 20 to have a coil shape. Therefore, the first metal strip M1 and the second metal strip M2 may be continuously and consecutively supplied without interruption.

Figure 6:
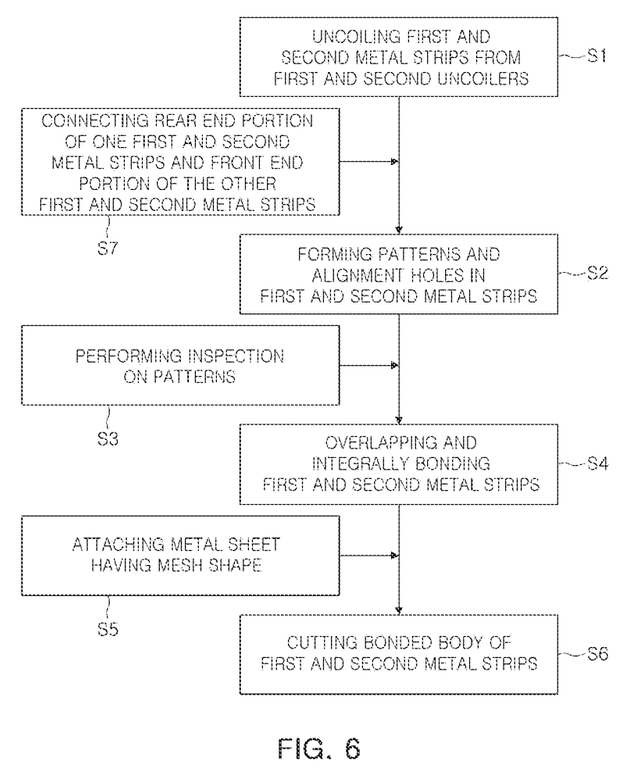
FIG. 6 is a flowchart illustrating a method of manufacturing a separator plate for a fuel cell, according to another embodiment of the present disclosure.

A method of manufacturing a separator plate for a fuel cell, according to an embodiment of the present disclosure, will be described with reference to FIG. 6. FIG. 6 is a flowchart illustrating a method of manufacturing a separator plate for a fuel cell, according to another embodiment of the present disclosure.

First, a method of manufacturing a separator plate for a fuel cell may be started by uncoiling and transferring a first metal strip M1 from a first uncoiler 10, and uncoiling and transferring a second metal strip M2 from a second uncoiler 20 (S1).

Next, the first metal strip M1 uncoiled and transferred from the first uncoiler 10 and the second metal strip M2 uncoiled and transferred from the second uncoiler 20 may be arranged side by side in a vertical direction, and an anode plate pattern AP may be formed on the first metal strip M1 and a cathode plate pattern CP may be formed on the second metal strip M2, by processing in a press 30 (a forming operation, S2).

A first alignment hole H1 may be formed in the first metal strip M1 together with the anode plate pattern AP, and a second alignment hole H2 may be formed in the second metal strip M2 together with the cathode plate pattern CP.

Next, the anode plate pattern AP and the cathode plate pattern CP may be inspected in the first metal strip M1 and the second metal strip M2, transferred after the forming operation (an inspection operation, S3). According to an embodiment, inspection of the first alignment hole H1 and inspection of the second alignment hole H2 may also be performed together.

The inspection may be to check whether there is an abnormality in appearance, location, or breakage (crack) of a pattern, or the like, and may be performed by, for example, reading a captured image using a camera.

Next, the first metal strip M1 and the second metal strip M2, transferred, may overlap each other and may weld the anode plate pattern AP and the cathode plate pattern CP, aligned to face each other, to be integrally bonded (a bonding operation, S4).

In this case, the first metal strip M1 and the second metal strip M2 may overlap each other in a state in which the first alignment hole H1 and the second alignment hole H2 correspond to each other, to align the anode plate pattern AP and the cathode plate pattern CP.

According to an embodiment, after the bonding operation, an operation of attaching a metal sheet having a mesh shape to a surface of at least one of the first metal strip M1 or the second metal strip M2 may be further performed (an attachment operation, S5). The metal sheet may be attached by welding, and may constitute a flow path, together with the anode plate pattern AP or the cathode plate pattern CP.

Next, the bonded body of the first metal strip M1 and the second metal strip M2, transferred after the bonding operation, may be cut and separated from the first metal strip M1 and the second metal strip M2 (a cutting operation, S6). Through this, a separator plate SP for a fuel cell in which an anode plate and a cathode plate are bonded may be manufactured by welding.

The separator plate SP for a fuel cell, manufactured in this manner, may be packaged and shipped by a loading apparatus as a final product, after performing a finishing process such as scrap processing or the like and performing an external inspection process, an air tightness inspection process, or the like.

When the first metal strip and the second metal strip are exhausted as the process progresses, new first and second metal strips may be mounted on the first and second uncoilers having no strip, respectively, and the coil joiner may be used to connect a rear end portion of one first metal strip uncoiled from the first uncoiler and a front end portion of new first metal strip mounted on the first uncoiler to have a coil shape, and connect a rear end portion of one second metal strip uncoiled from the second uncoiler and a front end portion of new second metal strip mounted on the second uncoiler to have a coil shape (a connection operation, S7).

Therefore, the first metal strip M1 and the second metal strip M2 may be continuously and consecutively supplied without interruption.

While example embodiments have been illustrated and described above, it will be apparent to those skilled in the art that modifications and variations could be made without departing from the scope of the present disclosure as defined by the appended claims.

The invention claimed is:

1. Equipment for manufacturing a separator plate for a fuel cell, comprising:
   a first uncoiler uncoiling a first metal strip;
   a second uncoiler uncoiling a second metal strip;
   a press receiving the first metal strip and the second metal strip to respectively form patterns thereon;
   a welding machine overlapping and integrally bonding the first metal strip and the second metal strip, transferred from the press, by a welding process; and
   a cutter cutting a bonded body of the first metal strip and the second metal strip, transferred from the welding machine,
   wherein the press comprises a first mold, a second mold disposed below the first mold, a first punch disposed between the first mold and the second mold to face the first mold, and a second punch disposed between the first mold and the second mold opposite the first punch to face the second mold,
   wherein the first punch and the second punch are mechanically connected via a movable middle frame and configured to reciprocate integrally between the first mold and the second mold, and
   wherein the press, the welding machine, and the cutter are sequentially arranged, and the first metal strip and the second metal strip are passed through the press, the welding machine, and the cutter, while connected to each other, to be processed.

2. The equipment of claim 1, wherein the press further forms a first alignment hole and a second alignment hole in the first metal strip and the second metal strip, respectively,
   wherein the first metal strip and the second metal strip, transferred from the press, overlap in a state in which the first alignment hole and the second alignment hole correspond to each other, to align the patterns to face each other.

3. The equipment of claim 1, further comprising an inspection machine disposed between the press and the welding machine,
   wherein the inspection machine performs inspection on the patterns of the first metal strip and the second metal strip, transferred from the press to the welding machine.

4. The equipment of claim 1, further comprising a plurality of guide rolls disposed in at least one of a front position or a rear position of the press, to pass the first metal strip through the press in a position spaced apart from the second metal strip in a vertical direction and supply the first metal strip to the welding machine, to guide the first metal strip.

5. A method of manufacturing a separator plate for a fuel cell, comprising:
   a forming operation of arranging a first metal strip uncoiled and transferred from a first uncoiler and a second metal strip uncoiled and transferred from a second uncoiler side by side in a vertical direction, and forming an anode plate pattern on the first metal strip and forming a cathode plate pattern on the second metal strip by processing with a press;
   a bonding operation of overlapping the first metal strip and the second metal strip, transferred after the forming operation, and welding the anode plate pattern and the cathode plate pattern, aligned to face each other, to be integrally bonded; and
   a cutting operation of cutting a bonded body of the first metal strip and the second metal strip, transferred after the bonding operation, to separate the first metal strip and the second metal strip,
   wherein the press comprises a first mold, a second mold disposed below the first mold, a first punch disposed between the first mold and the second mold to face the first mold, and a second punch disposed between the first mold and the second mold opposite the first punch to face the second mold,
  wherein the first punch and the second punch are mechanically connected via a movable middle frame and configured to reciprocate integrally between the first mold and the second mold, and
  wherein the first metal strip and the second metal strip are processed by sequentially performing the forming operation, the bonding operation, and the cutting operation in an in-line manner.

6. The method of claim 5, wherein the forming operation further comprises forming a first alignment hole in the first metal strip and forming a second alignment hole in the second metal strip,
  wherein in the bonding operation, the first metal strip and the second metal strip overlap in a state in which the first alignment hole and the second alignment hole correspond to each other, to align the anode plate pattern and the cathode plate pattern.

7. The method of claim 5, further comprising an inspection operation of inspecting the anode plate pattern and the cathode plate pattern in the first metal strip and the second metal strip, transferred after the forming operation.

8. The method of claim 5, further comprising an attachment operation of attaching a metal sheet having a mesh shape to a surface of at least one of the first metal strip or the second metal strip, after the bonding operation.

9. The equipment of claim 1, wherein the first punch and the second punch are configured to reciprocate integrally between the first mold and the second mold along at least one guide rod.

* * * * *